United States Patent [19]

Blankevoort et al.

[11] Patent Number: 5,311,300

[45] Date of Patent: May 10, 1994

[54] CIRCUIT ARRANGEMENT FOR ACCURATELY ADJUSTING EACH COLOR CHANNEL OF A PICTURE SIGNAL GENERATOR USING DIGITAL CONTROL SIGNALS

[75] Inventors: Jaap E. Blankevoort, Eindhoven; Johannes H. J. M. Van Rooy, Den Bosch; Lucien Schenk, Breda, all of Netherlands

[73] Assignee: U.S. Philips Corporation, New York, N.Y.

[21] Appl. No.: 9,702

[22] Filed: Jan. 27, 1993

[30] Foreign Application Priority Data

Feb. 8, 1992 [DE] Fed. Rep. of Germany ....... 4203717

[51] Int. Cl.$^5$ .................... H04N 9/64; H04N 5/14
[52] U.S. Cl. .................................. 348/690
[58] Field of Search .................. 358/37, 36, 166, 164, 358/168, 170, 174, 167, 27; H04N 9/64, 5/202, 5/52, 5/14, 5/20

[56] References Cited

U.S. PATENT DOCUMENTS

| | | | |
|---|---|---|---|
| 4,470,067 | 9/1984 | Mino | 358/174 |
| 4,623,924 | 11/1986 | Wargo | 358/37 |
| 4,757,373 | 7/1988 | Van Rooy | 358/37 |
| 4,821,100 | 4/1989 | Yamamoto | 358/170 |
| 4,837,625 | 6/1989 | Douziech | 358/174 |

FOREIGN PATENT DOCUMENTS

| | | | |
|---|---|---|---|
| 4023569 | 1/1992 | Japan | H04N 5/20 |
| 4035174 | 2/1992 | Japan | H04N 5/20 |

Primary Examiner—James J. Groody
Assistant Examiner—Chris Grant
Attorney, Agent, or Firm—Edward W. Goodman

[57] ABSTRACT

A circuit arrangement for adaptive white-compression of video signals of a color television apparatus, particularly of a HDTV picture signal generator, which has a signal minimum detector circuit (4, 5, 6) in each color channel. Input color signals (R, G, B) as well as a compressed color signal are applied to these detector circuits, while the smaller of the two input signals can be derived from their outputs. The compressed color signals are generated by digitally controlled multiplier circuits (14, 15, 16). The digital control signal for these multiplier circuits is generated by controlling an up-/down counter (24) by a digitized steering signal derived from the video output signals by line-sequential measurement and comparison with a threshold value reference signal.

8 Claims, 1 Drawing Sheet

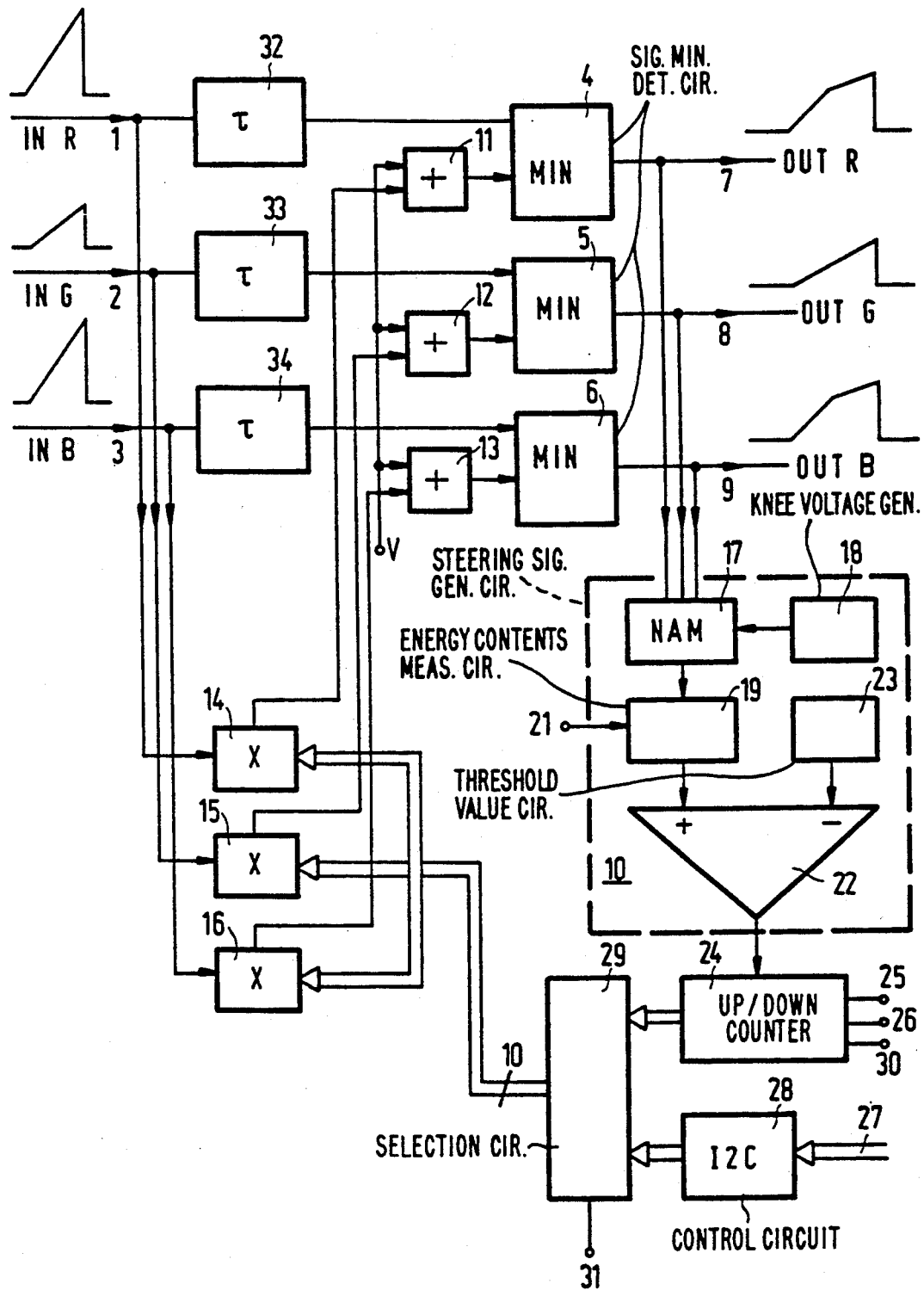

CIRCUIT ARRANGEMENT FOR ACCURATELY ADJUSTING EACH COLOR CHANNEL OF A PICTURE SIGNAL GENERATOR USING DIGITAL CONTROL SIGNALS

BACKGROUND OF THE INVENTION

1. Field of the Invention

The invention relates to a circuit arrangement for adaptive white-compression of video signals of a color television apparatus, particularly of a picture signal generator, with each color channel including a signal minimum detector circuit having input for receiving a color signal and a compressed color signal derived therefrom, and an output for furnishing a color output signal which is the smaller of its two input signals, each color channel further comprising a multiplier circuit having a signal input for receiving a color signal and a control input for receiving a control signal derived from the color output signals of the minimum detector circuits.

2. Description of the Related Art

Such a circuit arrangement is known from U.S. Pat. No. 4,757,373. In this circuit arrangement, the video signals as well as the control signals are processed as analog signals. However, particularly in HDTV picture signal generators, such as HDTV color television cameras or HDTV film scanners, this may lead to visible errors or to inaccuracies in the display of color pictures.

SUMMARY OF THE INVENTION

It is therefore an object of the present invention to provide a circuit arrangement of the type described in the opening paragraph, in which, without the use of a larger number of components, the different color channels can be adjusted accurately, which adjustment can be repeated at all times.

This object is achieved by an up/down counter for furnishing a digital control signal and having a control input for receiving a digitized steering signal derived from the color output signal by line-sequential measurement and comparison with a threshold value reference signal, and an output coupled to the control inputs of the multiplier circuits, the analog color signals being multiplied by a factor between 0 and 1 by means of the digital control signal.

The circuit arrangement according to the invention has the advantage that the generation and use of a digital control signal yields a fast and correct adjustment of each color channel so as to avoid color distortions, while a satisfactory channel matching is guaranteed.

BRIEF DESCRIPTION OF THE DRAWING

These and other aspects of the invention will be apparent from and elucidated with reference to the accompanying drawing in which the sole FIGURE shows a circuit block diagram of an embodiment of the invention.

In the block diagram shown in the FIGURE, for adaptive white-compression of video signals, the color signals R, G, B generated by the optoelectronic converters are applied to the input terminals 1, 2, 3 of three color channels of a picture signal generator, for example a color television camera. These color signals are applied to the inputs of signal minimum detector circuits 4, 5, 6, the other inputs of which convey the corresponding white-compressed color signal. In these circuits 4, 5, 6, the smaller one of the two input signals is selected and applied as a correspondingly processed output signal R', G', B' to the output terminals 7, 8 and 9, respectively. This part of the circuit arrangement as well as its operation essentially corresponds to the circuit arrangement described in U.S. Pat. No. 4,757,373.

To generate the white-compressed video signals applied via adder stages 11, 12, 13 to the respective other inputs of the circuits 4, 5, 6, a circuit 10, 24 for generating a control signal is provided, whose output conveys a 10-bit wide digital signal for gain control of three multiplier circuits 14, 15 and 16 connected to the input terminals 1, 2 and 3, respectively, the outputs of said multiplier circuits being connected to first inputs of the adder stages 11, 12, 13. An adjustable direct voltage V is present at the respective other inputs of the adder stages 11, 12, 13 so as to raise the level of the white-compressed video signal in such a way that its maximum amplitude will be in the limiting range of approximately 80% to 100% of the standard level.

To generate the digital control signal which can be derived from the output of the circuit 10, 24, the outputs of the detector circuits 4, 5, 6 are connected, according to the invention, to respective inputs of a non-additive mixing circuit (NAM) 17. The output of a circuit 18 for generating an adjustable knee voltage is connected to a further input of the NAM circuit 17. As is known, only the largest of the applied input signals can be derived from the output of the NAM circuit 17, viz. only the part which is above the knee voltage level supplied by the circuit 18. This signal voltage, which can be derived from the output of the circuit 17, is applied to a measuring circuit 19 in which both the value and the duration of this signal voltage, i.e. its energy contents, are determined each time over a period of one line. Since the measurement is to be performed in each line, line retrace pulses are supplied via the input 21. The output signal of the circuit 19 representing the energy contents is now applied to a first (non-inverting) input of a comparator circuit 22 whose second (inverting) input conveys a threshold value voltage signal generated by a threshold value circuit 23. These two signals are now compared with each other in the comparator circuit 22 and when the threshold value is exceeded, a "high" signal is supplied at the output of the comparator circuit 22.

The output of the comparator circuit 22 is connected to a steering input of an up/down counter 24 which has also two clock inputs-25 for a clock signal having a low clock frequency, and 26 for a clock signal having a high clock frequency. This counter 24, which may be, for example an EPLD (erasable programmable logic device) EP610 of Altera, operates in such a way that it counts down fast in the presence of a "high" signal due to the clock signal present at terminal 26, whereas it counts up slowly in the presence of a "low" signal due to the clock signal present at terminal 25. The 10-bit wide digital word supplied at the output of the counter 24 now controls the multiplier circuits 14 to 16 in such a way that a fast count-down correspondingly decreases the amplification and a slow count-up correspondingly increases the amplification. The decrease of the amplification is realized during one frame period at a maximum, and the increase of the amplification is realized in approximately 1 second at a maximum.

The use of a digital counter 24 yields the further advantage that the amount of white-compression applied to the color signals RGB is always precisely available. When this amount is conveyed with the RGB signals, it is possible to perform a decompression which allows for a better match with another video signal which might have been obtained from movie film.

The counter 24 has a further signal input 30 via which a signal for stopping the counter can be applied so as to retain the control signal value which has just been provided.

This hold function results in that the present state of the control is frozen. Camera operators might wish to use this option when they have taken pictures from a first scene having, for example, a bright background like a window, so that the control is adjusted to this first scene, and thereafter want to take pictures from a second scene, for example, the inside of the room, without causing the control setting to change. This yields the advantage that when, thereafter, pictures from the first scene are taken again, no adjustment of the control setting is required.

The circuit for generating a digital control signal hitherto described relates to an automatic adjustment of the white-compression. However, it is also possible to adjust the white-compression manually and by remote control. For this purpose, a signal is applied via an I2C bus connection 27 to an I2C control circuit 28. For optional connection of one of the output signals of the counter 24 or of the control circuit 28 to the control inputs of the multiplier circuits 14 to 16, a selection circuit 29 is provided which can be switched to the automatic or manual white-compression by means of a signal present at a control input 31. This 10-bit wide digital signal present at the control inputs of the multiplier circuits 14 to 16 provides the possibility of controlling their amplification very precisely by multiplication of the input signals by a factor between 0 and 1. Delay circuits 32, 33 and 34, for accurately matching, with respect to time, the input color signals R, G, B with the white-compressed video signals generated in the multiplier circuits 14, 15, 16, are arranged in each color channel between the input terminals 1, 2, 3 and the detector circuits 4, 5, 6, respectively.

We claim:

1. A circuit arrangement for adaptive white-compression of video signals of a color picture signal generator, having a color signal channel for processing each of three color signals (R, G, B), each of said color channels including a signal minimum detector circuit having a first input for receiving a respective one of said color signals (R, G, B), and a second input for receiving respective compressed color signals, and an output for furnishing a respective color output signal (R', G', B') which is the smaller of the signals applied to the first and second inputs, each of said color channels further comprising a multiplier circuit having a signal input for receiving a respective one of the color signals (R, G, B), a control input for receiving a digital control signal derived from the color output signals (R', G', B') of the minimum detector circuits, and an output for supplying a respective one of said compressed color signals coupled to the second input of the respective minimum detector circuit, characterized in that said circuit arrangement further comprises means for generating a digitized steering signal from the color output signals (R', G', B') by line-sequential measurement of the energy contents of the largest of said color output signals over a period of one line, and comparison of said energy contents with a threshold value reference signal; and an up/down counter for furnishing said digital control signal, said up/down counter having a control input for receiving said digitized steering signal, and an output coupled to the control inputs of the multiplier circuits, whereby the color signals (R, G, B) respectively applied to the multiplier circuits are multiplied by a factor between 0 and 1 in response to the digital control signal thereby forming the compressed color signals.

2. A circuit arrangement as claimed in claim 1, characterized in that said up/down counter has a first clock input for receiving a first clock signal of low frequency for up-counting, and a second clock input for receiving a second clock signal of high frequency for down-counting, the digitized steering signal controlling the counting direction of the counter in such a way that when said digitized steering signal is a "high" signal, the counter counts down at a fast rate controlled by said second clock signal, and when said digitized steering signal is a "low" signal, the counter counts up at a slow rate controlled by said first clock signal, and in that a digital word representing a count value in the counter is being provided at the output of the counter.

3. A circuit arrangement as claimed in claim 2, characterized in that the down-counting maximum duration is approximately one frame period and the maximum up-counting duration is approximately 1 second.

4. A circuit arrangement as claimed in claim 1, characterized in that the means for generating the digitized steering signal comprises a non-additive mixing (NAM) circuit having inputs for receiving the output color signals (R', G', B'), and an output for providing the portion of the largest of the output color signals exceeding a voltage level of a knee voltage; a measuring circuit for providing the energy contents, line sequentially, of the output of the NAM circuit, said measuring circuit having an input coupled to the output of the NAM circuit and an output for providing said energy contents; and a comparator having a first input for line-sequentially receiving the energy contents signal, a second input for receiving a threshold reference signal, and an output for furnishing the digitized steering signal, said digitized steering signal being a "high" signal whenever the energy contents of the signal line-sequentially exceed the threshold value of the reference signal and being a "low" signal otherwise.

5. A circuit arrangement as claimed in claim 1, characterized in that said circuit arrangement further comprises a selection circuit arranged between the output of the up/down counter and control inputs of the multiplier circuits, said selection circuit having further inputs connected to outputs of an I2C bus connection via which a manually adjustable digital control signal is selectively applied to the control inputs of the multiplier circuits.

6. A circuit arrangement as claimed in claim 5, characterized in that the selection circuit is manually controllable.

7. A circuit arrangement as claimed in claim 1, characterized in that the circuit arrangement further comprises adder stages respectively connected between the outputs of the multiplier circuits and the second inputs of the signal minimum detector circuits, each of said adder stages having a second input for receiving an adjustable direct voltage (V).

8. A circuit arrangement as claimed in claim 1, characterized in that said circuit arrangement further comprises a signal delay circuit arranged in each color channel upstream of the color signal input of each minimum detector circuit.

* * * * *